US011388968B2

(12) United States Patent
Dabov et al.

(10) Patent No.: US 11,388,968 B2
(45) Date of Patent: Jul. 19, 2022

(54) RF TRANSPARENT STRUCTURAL SUPPORT MEMBER FOR CONSUMER ELECTRONICS

(71) Applicant: Snap Inc., Santa Monica, CA (US)

(72) Inventors: Teodor Dabov, Los Angeles, CA (US); John Bernard Ardisana, II, Torrance, CA (US); Yoav Ben-Haim, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 261 days.

(21) Appl. No.: 16/686,329

(22) Filed: Nov. 18, 2019

(65) Prior Publication Data

US 2020/0187613 A1 Jun. 18, 2020

Related U.S. Application Data

(60) Provisional application No. 62/781,327, filed on Dec. 18, 2018.

(51) Int. Cl.
*A45C 11/04* (2006.01)
*A45C 13/00* (2006.01)
*H02J 7/00* (2006.01)

(52) U.S. Cl.
CPC ............ *A45C 11/04* (2013.01); *A45C 13/005* (2013.01); *H02J 7/0044* (2013.01)

(58) Field of Classification Search
CPC . A45C 11/04; A45C 13/005; A45C 2011/003; H02J 7/0044
USPC ........................................................ 206/5, 6
See application file for complete search history.

(56) References Cited

U.S. PATENT DOCUMENTS

| 5,878,873 | A   | * | 3/1999  | Clark         | A45C 13/1084 |
|           |     |   |         |               | 206/6        |
| 6,923,313 | B1  | * | 8/2005  | Orogun-Thomas |              |
|           |     |   |         |               | A45C 11/043  |
|           |     |   |         |               | 206/5        |
| 2013/0147330 | A1 | * | 6/2013 | DiFonzo | H04B 1/3888 |
|           |     |   |         |               | 312/297      |
| 2013/0233762 | A1 | * | 9/2013 | Balaji  | B29C 65/7802 |
|           |     |   |         |               | 206/736      |
| 2014/0361081 | A1 | * | 12/2014 | Glanzer | G06K 7/10009 |
|           |     |   |         |               | 235/449      |

(Continued)

FOREIGN PATENT DOCUMENTS

WO 2015034719 A1 3/2015

OTHER PUBLICATIONS

International Search Report and Written Opinion for International Application No. PCT/US2019/061927, dated Mar. 10, 2020 (dated Mar. 10, 2020)—13 pages.

*Primary Examiner* — King M Chu
(74) *Attorney, Agent, or Firm* — Culhane Meadows PLLC; Stephen J. Weed

(57) ABSTRACT

A case has an interior space for stowing an article. The case includes a structural support member that provides rigidity to the case and is composed of an RF transparent material to permit the passage of wireless signals through the case. The structural support member may be a hinge for moving the case between a stowed configuration and an expanded configuration. The RF transparent material may be flexible sheet composed of a fiber reinforced resin, for example. Also described is an assembly including the case and an electronics-enabled eyewear device.

17 Claims, 4 Drawing Sheets

(56) References Cited

U.S. PATENT DOCUMENTS

| | | | |
|---|---|---|---|
| 2016/0073747 A1* | 3/2016 | Whichel | A45C 13/30 150/118 |
| 2018/0090958 A1 | 3/2018 | Steger et al. | |
| 2018/0136491 A1 | 5/2018 | Ashwood et al. | |

* cited by examiner

US 11,388,968 B2

RF TRANSPARENT STRUCTURAL SUPPORT MEMBER FOR CONSUMER ELECTRONICS

CROSS-REFERENCE TO RELATED APPLICATION

This application claims priority to U.S. Provisional Application Ser. No. 62/781,327 entitled RF TRANSPARENT STRUCTURAL SUPPORT MEMBER FOR CONSUMER ELECTRONICS, filed on Dec. 18, 2018, the contents of which are incorporated fully herein by reference.

TECHNICAL FIELD

The subject matter disclosed herein relates generally to a structural support member for consumer electronics, and more specifically, to a hinge for a charging case for electronics enabled eyewear, and more specifically, to a hinge composed of a radio frequency (RF) transparent material that permits the transmission of RF signals therethrough for a charging case for electronics enabled eyewear.

BACKGROUND

Electronics-enabled eyewear devices, such as smart glasses, typically have integrated electronics requiring an onboard power supply in the form of a battery. Disclosed herein is an eyewear case that is multifunctional in that it stows the glasses and, also, serves as a docking station for charging of the smart glasses battery. Additionally, wireless signals propagate between the glasses within the eyewear case and either a phone or Wi-Fi connection external to the case. Such as a case is disclosed in U.S. patent application Ser. No. 62/691,801, filed Jun. 29, 2018, which is incorporated by reference in its entirety and for all purposes.

While charging cases for electronics enabled eyewear are known, developments for such cases are continuously sought in the interests of enhancing usability, wireless communications, user convenience, and structural integrity, for example.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
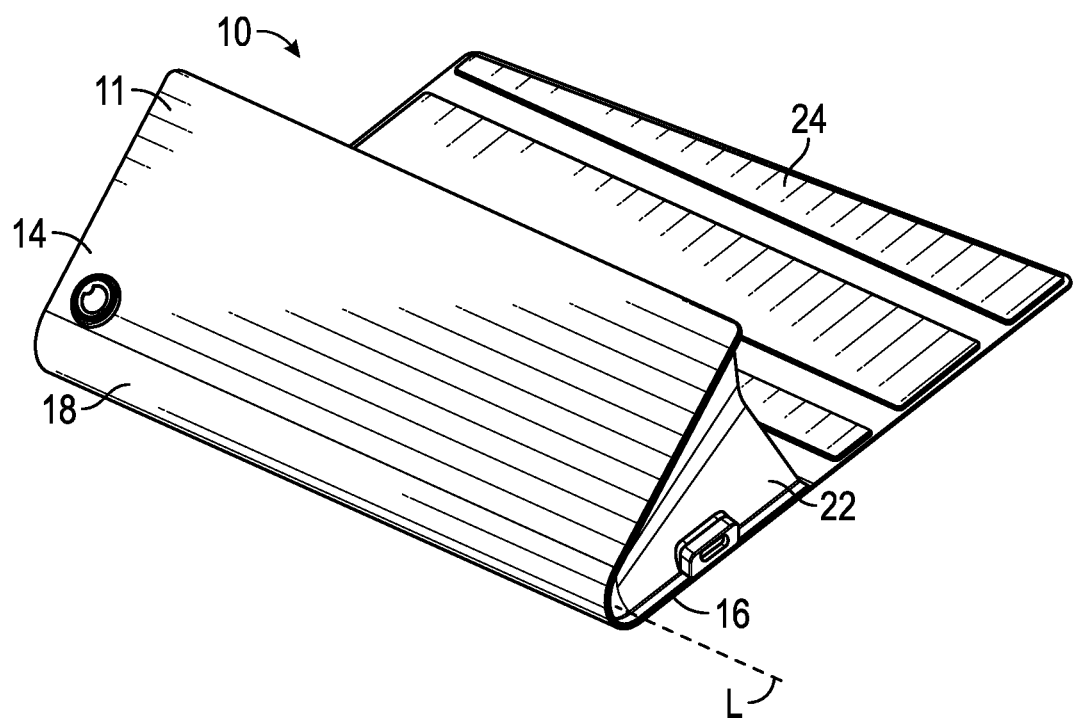
FIGS. 1 and 2 each illustrate an example for explaining an isometric view of a charging case shown open and expanded according to some embodiments.

In the following detailed description, numerous specific details are set forth by way of examples in order to provide a thorough understanding of the relevant teachings. However, it should be apparent to those skilled in the art that the present teachings may be practiced without such details.

This description of the embodiments that follows is intended to be read in connection with the accompanying drawings, which are to be considered part of the entire written description. In the description, relative terms such as "right," "left," "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both removable or rigid attachments or relationships, unless expressly described otherwise.

According to one aspect, a case has an interior space for stowing an article. The case comprises a structural support member that provides rigidity to the case and is composed of an RF transparent material to permit the passage of wireless signals through the case. The RF transparent material may be a fiber reinforced resin or fiberglass, for example.

According to another aspect, a case for electronics enabled eyewear comprises a body defining an opening leading to a storage chamber for retaining the eyewear, a front surface, a rear surface, a bottom surface connecting the front surface to the rear surface, and left and right side walls each connecting the front, rear and bottom surfaces. A structural support member provides rigidity to the case and is composed of an RF transparent material that permits the passage of wireless signals through the case.

According to yet another aspect, an assembly comprises an electronics-enabled eyewear device and a case for stowing the electronics-enabled eyewear device. The case comprises a structural support member that provides rigidity to the case and is composed of an RF transparent material to permit the passage of wireless signals through the case.

Figure 2:
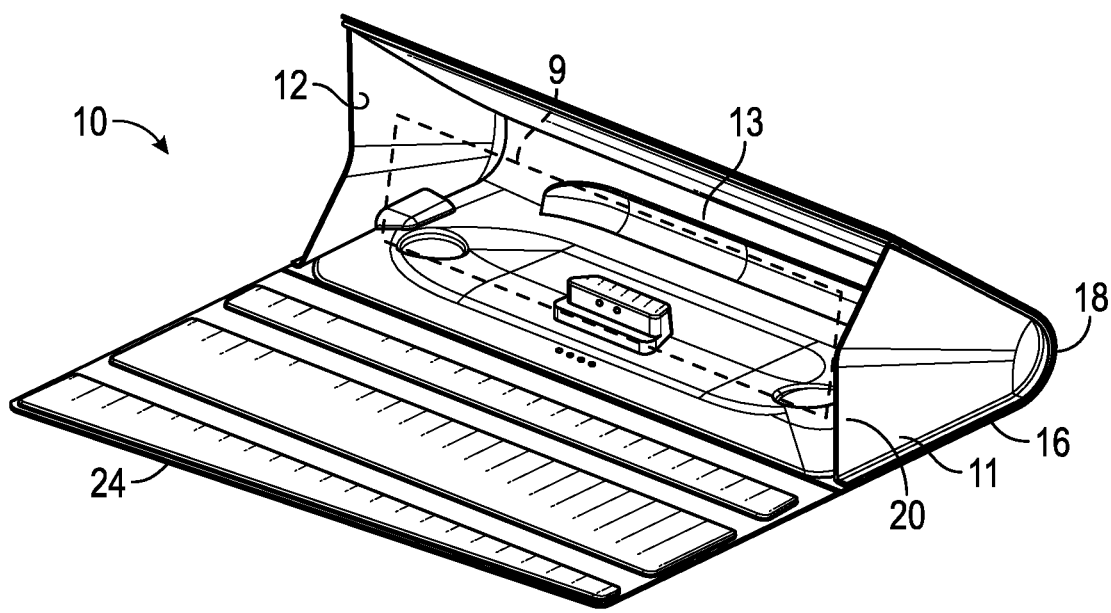
Figure 3:
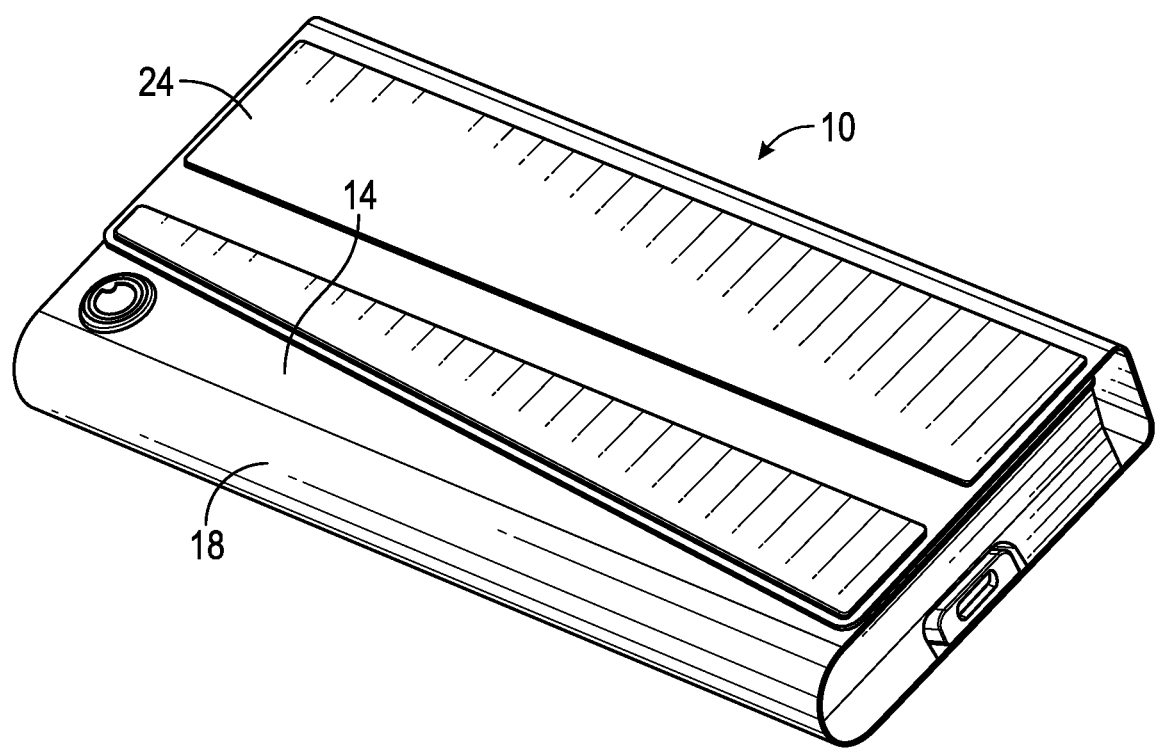
FIG. 3 illustrates an example for explaining an isometric view of a charging case shown both closed and collapsed according to some embodiments.
Figure 4:
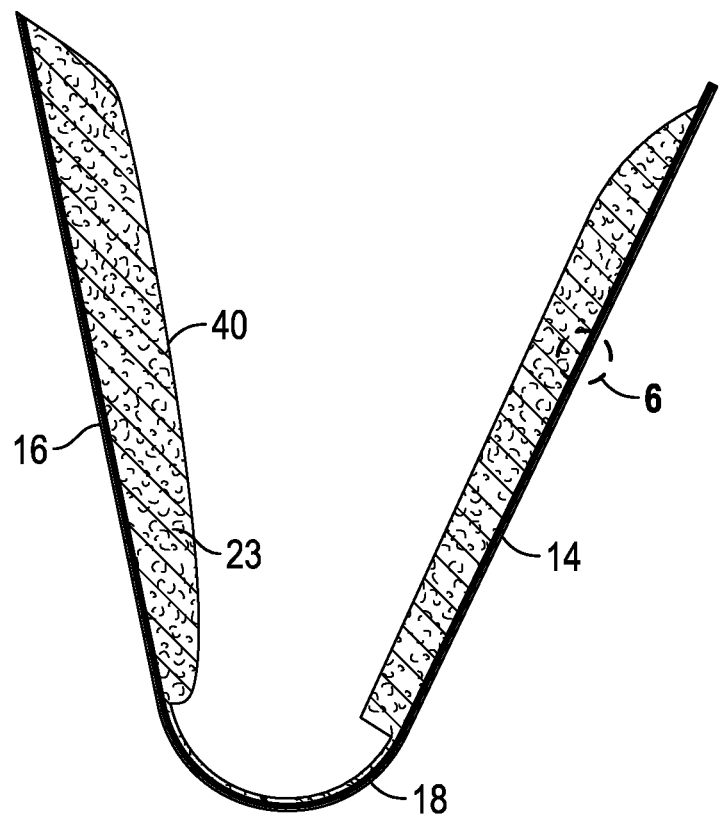
FIG. 4 illustrates an example for explaining a side elevation view of a hinged wall of a charging case according to some embodiments.
Figure 5:
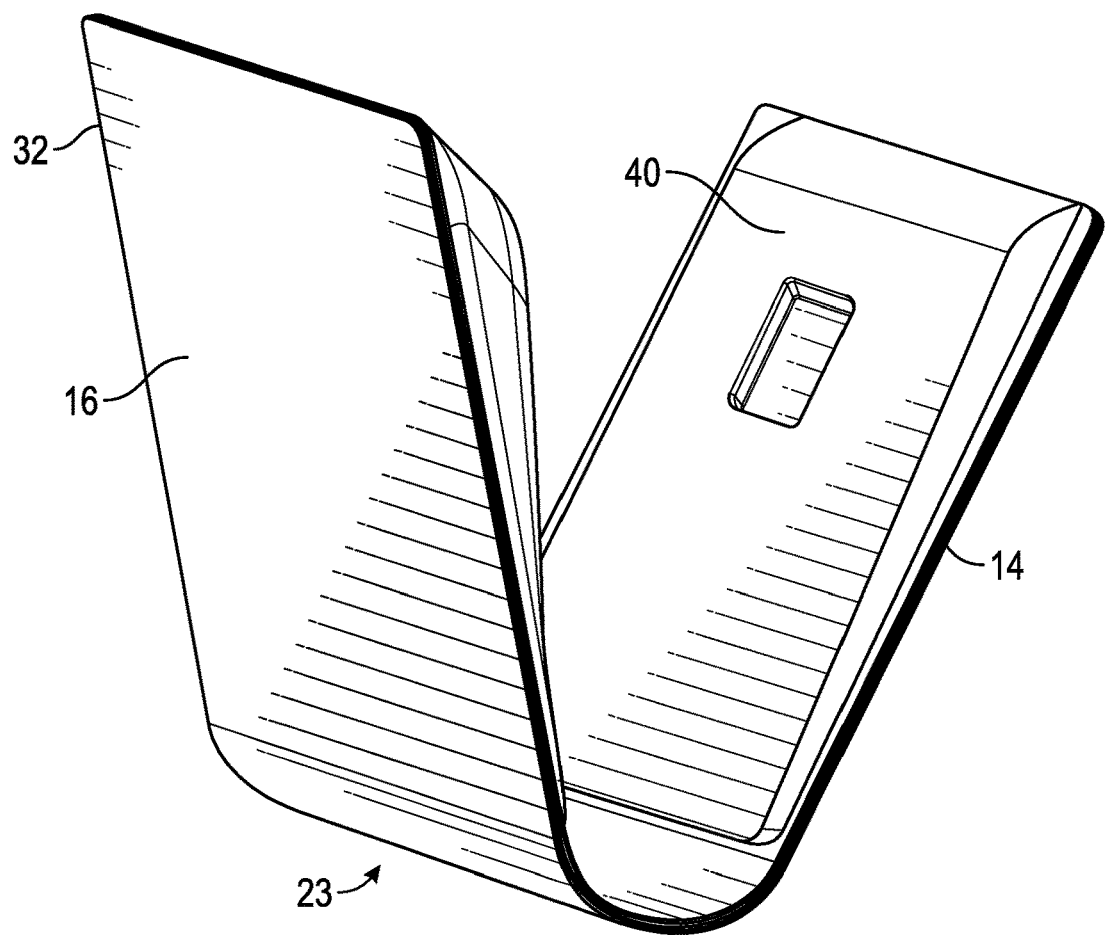
FIG. 5 illustrates an example for explaining an isometric view of a hinged wall according to some embodiments.
Figure 6:
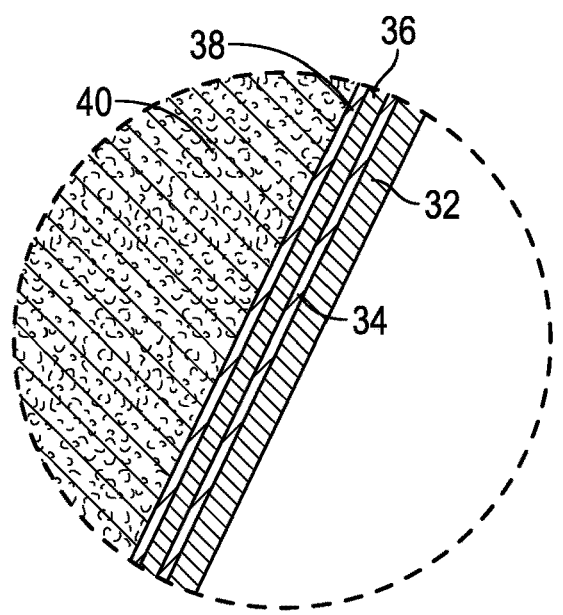
FIG. 6 illustrates an example for explaining a detailed view of the hinged wall of FIG. 4 according to some embodiments.
Figure 7:
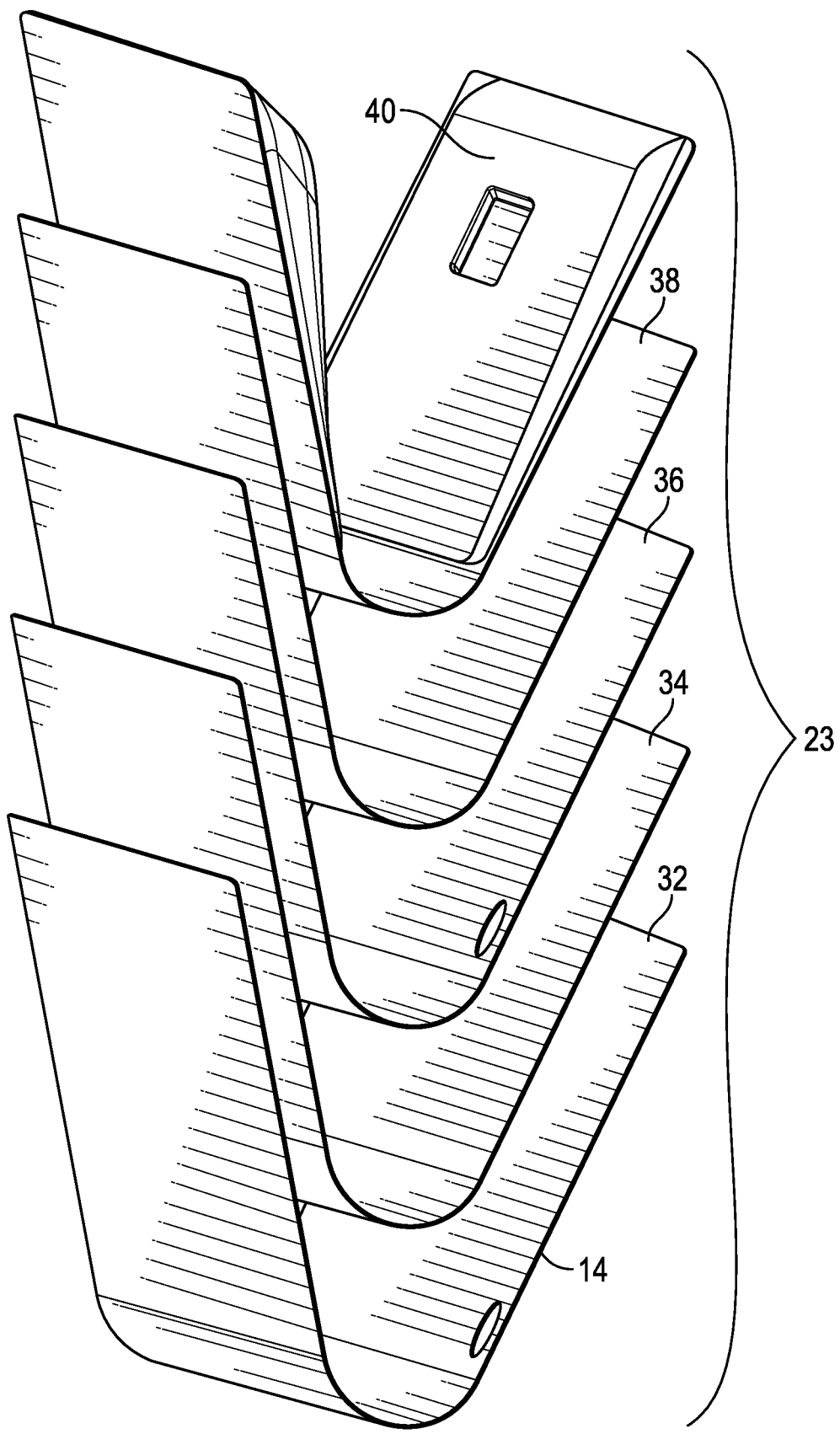
FIG. 7 illustrates an example for explaining an exploded view of the hinged wall.

FIGS. 1-3 show a charging case 10 having a clam shell design for stowing electronics enabled eyewear 9 (otherwise referred to herein as eyewear or glasses) according to one embodiment. The eyewear 9 is shown schematically in FIG. 2. The case 10 comprises a body 11 having an opening 12 leading to a hollow cavity 13 that is sized and shaped to receive and hold eyewear when the temples of the glasses are in a folded state.

The body 11 includes a rectangular shaped front wall 14; a rectangular shaped rear wall 16; a curved bottom wall 18 connecting the front and rear walls 14 and 16; a triangular shaped left wall 20 interconnecting the left-side edges of the walls 14, 16 and 18; a triangular shaped right wall 22 interconnecting the right-side edges of the walls 14, 16 and 18; and a trapezoidal shaped flap 24 (also referred to herein as a cover) that extends from the top edge of the rear wall 16 for covering the opening 12 of the body 11 in a closed state of the case 10.

The front wall 14, the rear wall 16 and the curved bottom wall 18 together form a flexible hinged wall 23. Flexion of the hinged wall 23 beyond the expanded position shown in FIGS. 1 and 2 is delimited by the side walls 20 and 22. The remaining walls described above may be connected to the hinged wall 23 by any means known to those skilled in the art, such as lamination, stitching, adhesive, welding, fasteners, and so forth. Alternatively, one or more of the remaining walls described above, such as the flap 24, may be integrally formed with the hinged wall 23.

As best shown in FIGS. 4-7, the V-shaped hinged wall 23 includes a plurality of layers that are mounted together. The layers all have the same approximate outer dimensions. The outer dimensions of each layer correspond to that of the front wall 14, the rear wall 16 and the curved bottom wall 18.

More particularly, the hinged wall 23 includes the following layers as they appear in order from the exterior toward the interior of the case 10: exterior cover 32, adhesive layer 34, hinge 36, adhesive layer 38, and interior cover 40. The exterior cover 32 and the interior cover 40, which are visible to the end user, may be formed from any flexible material such as microfiber, leather (natural or artificial), cloth, felt or plastic, by way of example. The interior cover 40 includes soft padded segments against which the eyewear may be placed. The adhesive layers 34 and 38 may be a heat activated thermosetting polyurethane adhesive film or any other adhesive that is known to those skilled in the art. Each layer may be composed of an RF transparent material that permits the transmission of RF signals therethrough. The exterior cover 32, adhesive layer 34, adhesive layer 38, and the interior cover 40 are also composed of flexible materials.

The flexible hinge 34 is also composed of an RF transparent material that permits the transmission of RF signals therethrough. The hinge 34 may be composed of a non-polymeric and non-metallic RF transparent material. As one example, the hinge 34 may be formed from a fiber reinforced resin, such as FR4 (G10) fiberglass. The hinge 34 may be composed of Kevlar, Nylon, PLEXIGLAS®, polytetrafluoroethene, polypropylene, Polyvinyl chloride, or acrylonitrile butadiene styrene (ABS), for example. According to a different embodiment, the hinge 34 may be formed from a material that may not be RF transparent, such as stainless steel, phospohor bronze, titanium-copper alloys, polycarbonate (PC), or polyethylene terephthalate (PET).

The hinge 34 may be provided in the form of a single V-shaped sheet, as shown, or the hinge 34 may comprises multiple V-shaped sheets that are disconnected from one another and positioned along the length L of the case 10. The hinge 34 may be an internal component that is laminated to another layer, or the hinge may be an external component of the case 10 (i.e., visible to a user) that is laminated to another layer. The hinge 34 confers structural rigidity to the case 10, and may be referred to herein as a structural support member.

The materials of the case 10 are RF transparent such that, in operation, wireless signals can propagate between glasses stowed/stored within the case 10 and either a phone or Wi-Fi connection that is external to the case 10. If the hinge of the case 10 were composed of aluminum, for example, (a non RF transparent material) then the aluminum would either limit or prevent the passage of wireless signals therethrough.

The natural state of the hinged wall 23 is the collapsed state shown in FIG. 3. Moving the case 10 from the collapsed state (FIG. 3) to the expanded state (FIGS. 1 and 2), in order to stow the glasses within the cavity 13 of the case 10, causes the hinged wall 23 to elastically deform in an outward direction. When either the glasses are removed from the cavity 13 of the case 10 or a force that is manually applied to the case 10 for maintaining the case in the expanded state is removed, the hinged wall 23 returns the case 10 to its natural collapsed state shown in FIG. 3.

The hinge 34 of the hinged wall 23 may be a living hinge, as shown. A living hinge is a flexible hinge that is made from the same material as the two segments that the hinge connects (i.e., front wall 14 and rear wall 16). The hinge 34 permits relative movement between the walls 14 and 16 about a hinge line 'L' defined along the length dimension of the curved bottom wall 18. The hinged wall 23 may also be referred to herein as a mechanical spring.

According to some embodiments, the case 10 is incapable of moving between the collapsed and expanded configurations and is permanently maintained in the expanded configuration. In this embodiment, the hinge 34 is simply a structural support member that provides structural rigidity to the case 10, and, due to its material composition, permits the passage of wireless signals through the case 10. For this reason, the hinge 34 may be more generally referred to herein as a structural support member. The hinge 34 may also be referred to as a frame member, spine, panel, sleeve, strip or wall.

Although the case 10 is described for use with eyewear, it should be understood that the case 10 may be configured for stowing any article, and the article may or may not be capable of transmitting/receiving wireless signals.

Although an overview has been described with reference to specific example embodiments, various modifications and changes may be made to these embodiments without departing from the broader scope of embodiments of the present disclosure. Such embodiments may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A case having an interior space for stowing an electronic article, the case comprising:
   an exterior layer;
   an interior layer;
   a structural support member that is composed of an RF transparent material to permit the passage of wireless signals through the case, wherein the structural support member is positioned between the exterior layer of the case and the interior layer of the case; and
   an adhesive layer sandwiched between the structural support member and the exterior layer, and another adhesive layer sandwiched between the structural support member and the interior layer.

2. The case of claim 1, wherein the structural support member is composed of fiber reinforced resin.

3. The case of claim 1, wherein the structural support member is a living hinge.

4. The case of claim 1, wherein the structural support member is embedded within an interior of the case or is disposed on a visible exterior surface of the case.

5. The case of claim 1, wherein the structural support member and each of the layers have the same approximate dimensions.

6. The case of claim 1, wherein an entirety of the case is composed of an RF transparent material.

7. The case of claim 1, wherein the structural support member is a hinge that is configured to move the body from an expanded position to a collapsed position.

8. A case for electronics enabled eyewear, the case comprising:
- a body defining an opening leading to a storage chamber for retaining the eyewear, a front surface, a rear surface, a bottom surface connecting the front surface to the rear surface, and left and right side walls each connecting the front, rear and bottom surfaces, and
- a structural support member that is composed of an RF transparent material that permits the passage of wireless signals through the case, wherein the structural support member is positioned between an exterior layer of the case and an interior layer of the case.

9. The case of claim 8, wherein the structural support member is entirely composed of an RF transparent material.

10. The case of claim 8, wherein the structural support member is composed of fiber reinforced resin.

11. The case of claim 8, wherein the structural support member is a hinge that is configured to move the body from an expanded position for housing the electronics enabled eyewear to a collapsed position.

12. The case of claim 11, wherein the hinge is a living hinge.

13. An assembly comprising an electronics-enabled eyewear device that is configured to send and receive messages and a case for stowing the electronics-enabled eyewear device, the case comprising a structural support member that is composed of an RF transparent material to permit the passage of wireless signals through the case, wherein the structural support member is positioned between an exterior layer of the case and an interior layer of the case.

14. The assembly of claim 13, wherein the structural support member is entirely composed of an RF transparent material.

15. The assembly of claim 13, wherein the structural support member is composed of fiber reinforced resin.

16. The assembly of claim 13, wherein the structural support member is a hinge that is configured to move the case from an expanded position for housing the electronics enabled eyewear device to a collapsed position.

17. The assembly of claim 13, wherein the case has a clam-shell design.

* * * * *